United States Patent
Marino, Jr.

(10) Patent No.: US 6,922,891 B1
(45) Date of Patent: Aug. 2, 2005

(54) METHOD OF MANUFACTURING A CATALYTIC CONVERTER

(76) Inventor: Robert J. Marino, Jr., 23 Washington Sq., Doylestown, PA (US) 18901

(*) Notice: Subject to any disclaimer, the term of this patent is extended or adjusted under 35 U.S.C. 154(b) by 749 days.

(21) Appl. No.: 09/698,107

(22) Filed: Oct. 30, 2000

(51) Int. Cl.[7] .................. B21D 51/16; B01D 50/00
(52) U.S. Cl. .................. 29/890; 29/458; 29/527.2; 29/455.1; 422/179; 422/180; 422/221; 422/222; 60/299
(58) Field of Search .................. 29/890, 890.08, 29/455.1, 458, 527.2, 530; 422/177, 179, 422/180, 221, 222; 60/299, 311, 322

(56) References Cited

U.S. PATENT DOCUMENTS

| | | | |
|---|---|---|---|
| 4,098,722 A | 7/1978 | Cairns et al. | 252/466 |
| 4,205,420 A | 6/1980 | Bothwell | 29/157 |
| 4,711,009 A | 12/1987 | Cornelison et al. | 29/157 |
| 4,935,392 A * | 6/1990 | Kainer et al. | 502/60 |
| 5,018,272 A | 5/1991 | Seeger et al. | 29/890 |
| 5,265,419 A * | 11/1993 | Bergmann et al. | 60/297 |
| 5,406,704 A | 4/1995 | Retallick | 29/890 |
| 5,608,968 A | 3/1997 | Maus et al. | 29/890 |
| 5,656,245 A | 8/1997 | Fujisawa et al. | 422/179 |
| 5,776,419 A * | 7/1998 | Ihara et al. | 422/177 |
| 6,245,302 B1 * | 6/2001 | Fujitsubo | 422/180 |
| 6,284,201 B1 | 9/2001 | Buck | |
| 6,436,873 B1 * | 8/2002 | Brocker et al. | 502/439 |
| 2004/0043899 A1 * | 3/2004 | Mangold et al. | 502/439 |

* cited by examiner

*Primary Examiner*—Marc Jimenez
(74) *Attorney, Agent, or Firm*—Gregory J. Gore

(57) ABSTRACT

A manufacturing process for producing a particulate reactor substrate according to the invention includes the steps of first roll-stamping small, raised dimples into the fabric substrate to control its coiled density. The dimpled fabric then undergoes high temperature firing for hardening and degreasing, and then water quenching to harden the metal which improves heat tolerance. The treated metal weave is then aluminum oxide shot-blasted to etch the fabric surface for improved ceramic coating adhesion and to increase surface area. Next, the fabric is coated with a wet slurry of an undercoating ("wash coat") prior to spooling and pressing the fabric into individualized cartridges that are held tightly wound by an encircling sleeve. Next, the sleeved spools are oven-fired and then the fired spools are impregnated with the catalytic precious metal. The impregnated sheathed spools are finally oven-fired again and "canned" into an outer enclosure.

6 Claims, 4 Drawing Sheets

METHOD OF MANUFACTURING A CATALYTIC CONVERTER

FIELD OF THE INVENTION

This invention relates to catalytic converters and particulate control devices for the exhaust of internal combustion engines. More specifically, this invention pertains to a carbon particulate oxidizer device which is intended for use with diesel engine exhaust. This invention also pertains to a process of manufacturing the oxidizer's unique catalytic element.

BACKGROUND OF THE INVENTION AND PRIOR ART

Recent, more stringent government regulation of diesel engine tailpipe emissions, have prompted development and application of various means to reduce these emissions. New diesel engine exhaust emissions regulations are focused on reducing diesel engine carbon particulate matter emissions (black soot). Of greatest concern are micron-sized carbon char particles, other particulate matter, and organic compounds which are adsorbed onto the surface of the carbon. A body of clear evidence now exists which links diesel particulate matter to a variety of serious respiratory illnesses including lung cancers and asthma. New environmental regulations worldwide are aimed at reducing particulate emissions from both new vehicles, and also existing vehicles already in use. Installing an exhaust gas treatment device to the engine's exhaust system is a common technique used to reduce particulate emissions. To this point, a highly efficient and cost effective device for diesel engines does not exist. Two devices currently in use are oxidation catalytic converters and particulate traps.

Oxidation Catalysts

An oxidation catalytic converter is a catalyst coated honeycomb-like, channeled ceramic substrate, through which exhaust gas passes. Viewing the face (exhaust entrance point) of the diesel substrate ceramic may present as many as 300 flow-through cells (channels) per square inch. The ceramic substrate is constructed by extruding or compressing a ceramic material into a honeycomb structure of desired length and width. Treating the honeycomb substrate with catalyst materials is achieved by drenching the substrate with a slurry containing ceramic and catalytic materials whereby the surface area along the length of every channel is coated and impregnated with catalytic materials. Diesel oxidation catalytic converter substrates are also made from metal foil material which is fan folded and fashioned into a honeycomb substrate with catalyst materials in a similar manner as ceramic substrates. A metal foil ceramic substrate offers similar overall catalytic effectiveness.

In operation, hot, polluted exhaust gasses mixed with oxygen pass through the catalyzed substrate channels. The catalytic reaction then occurs which converts ninety percent (90%) of the gaseous pollutants to non toxic carbon dioxide and water. Diesel oxidation catalysts, whether ceramic or metal foil, unfortunately only oxidize and reduce particulate matter approximately 25% by weight. Particulate emissions reduction is mainly the result of the extraction and oxidation of soluble organic matter attached to the carbon particles. Organic materials such as hydrocarbons attach to the carbon particles during and after combustion. Carbon soot seen as smoke tends to pass through the honeycomb substrate unaffected rather than oxidizing. The carbon portion of particulate matter is the visible portion of diesel engine exhaust. Oxidation catalysts therefore have little or no effect in reducing visible smoke emitted by diesel engines.

Particulate Traps

Diesel particulate filter traps physically filter exhaust gas before it exits the engine's exhaust pipe. Particulate filters are most typically porous solid barrier substrates made from ceramics and or silicon carbide materials. Less common are composite filter substrates made from ceramic fiber or randomly placed metal fibrils (steel wool). Efficient particulate traps can reduce particulate emissions by more than 90%. All currently available particulate trap devices are maintenance intensive and cost prohibitive for wide spread vehicle use. Clogging and overheating during regeneration are some of the technical problems which continue to plague these devices. Cost and technical problems have limited application of this technology.

The most common and commercially available particulate trap is the ceramic-type known as a "wall flow" filter trap. Like the flow-through honeycomb substrate, a ceramic wall flow particulate trap also has a honeycomb-like structure, however, a ceramic filter trap has very porous cell walls which are designed to allow exhaust gas to pass though the walls from one cell to another. This type of trap has honeycomb channels which are permanently closed off at one end in an alternating fashion. Plugging only one end of each channel prevents exhaust gas from passing straight through from one end to the other. Exhaust enters a cell which is open at the inlet side, yet closed at the outlet side. The gas enters the cell, then passes through the cell walls to an adjacent cell which is conversely open at the outlet side and plugged at the inlet side. Carbon particles too large to pass through the walls of the cell become trapped on the cell wall. Wall flow traps are designed to collect 90% or more of the carbon particulate matter in diesel exhaust.

Another type of particulate trap utilizes a packed fibril mass (steel wool) to capture carbon. These are filter devices intended to trap and house carbon particulate. Packed fibril traps consist of a random conglomeration of fine metal fibrils (steel wool) which are packed with varying density into a vessel. The individual fibrils are long, shaved metal slivers, inconsistent in shape and thickness, which are packed into a tangled, intertwined mass. Because of the random nature of the raw material, it is difficult to pack the fibrils repeatedly with the degree of manufacturing consistency necessary for predictable form, performance and durability. The resulting fibril pack results in inconsistent exhaust flow and filtering performance. In addition, the inconsistent density of the fibril mass tends to cause localized hot spots within the substrate during regeneration which destroys the fibril medium. Untreated with catalyst materials, this variety of trap relies on spontaneous combustion or assisted regeneration cycles to clear the unit of accumulated carbon. No practical method exists to cost effectively coat the fibrils with catalyst materials.

Regardless of the type of filter trap employed, dependable, safe regeneration (cleaning the filter of carbon) continues to be a problem with all. Regeneration is critical because over time, (20–30 miles of operation), particulate trap devices collect carbon soot filtered from the exhaust. Unless the accumulated soot frequently ignites either spontaneously or with assistance (known as trap regeneration), the trap will fill and clog. Trap clogging raises exhaust back pressure to a level which is damaging to the engine and the ceramic trap. In addition, rapid regeneration of traps which are overloaded with carbon, tend to overheat the filter substrate to the point of melt down and self-destruction. Except in a narrow range of applications, filter traps are widely regarded as costly, problematic and impractical for wide-ranging motor vehicle use.

The most pertinent patent art of which the applicant is aware is U.S. Pat. No. 5,830,415. This patent discloses a metallic mesh-like framework used in a diesel exhaust system for filtering soot. The framework also has the capability of carrying a catalyst to provide a catalytic effect. However, this reference does not teach or suggest the use of knitted metallic wires to create the mesh, but rather a process of plating urethane foam with nickel. This creates a degree of porosity which is much too restrictive to be used for other than filtering soot. Furthermore, it is an extremely time-consuming and a costly process for creating a metallic mesh framework.

Other patent prior art of which the applicant is aware includes the following:
U.S. Pat. No. 6,000,131 "Method of Making A Catalytic Converter for Use In An Internal Combustion Engine";
U.S. Pat. No. 5,656,245 "Catalytic Converter For Cleaning Exhaust Gas";
U.S. Pat. No. 5,584,175 "Heating Means For Catalyst Unit";
U.S. Pat. No. 5,850,734 "Close-Coupled Catalytic Converter System";
U.S. Pat. No. 5,018,272 "Method of Making An Exhaust Catalyst By Securing Wire Mesh Onto An Arbor";
U.S. Pat. No. 5,093,178 "Flow Divider";
U.S. Pat. No. 4,576,800 "Catalytic Converter For An Automobile";
U.S. Pat. No. 4,711,009 "Process For Making Metal Substrate Catalytic Converter Cores";
U.S. Pat. No. 5,165,899 "Element For Filter And/Or Purifying Hot Gases, And A Process For Manufacturing Same";
U.S. Pat. No. 5,366,139 "Catalytic Converter—Metal foil Material for Use Therein, And A Method Of Making The Material";
U.S. Pat. No. 5,402,928 "Method of Making Flute Tube";
U.S. Pat. No. 5,406,704 "Method For Making An Ignition Stage For A High Temperature Combustor";
U.S. Pat. No. 5,437,099 "Method Of Making A Combustion Apparatus For High-Temperature Environment";
U.S. Pat. No. 5,460,790 "Catalytic Vessel For Receiving Metal Catalysts By Deposition From The Gas Phase";
U.S. Pat. No. 5,516,383 "Method Of Making Metal For Catalytic Converters";
U.S. Pat. No. 5,608,968 "Method Of Making A Metal Honeycomb Body of Intertwined Sheet-Metal Layers";
U.S. Pat. No. 4,592,899 "Smoke Filter With Frangible Supported Filter Bed";
U.S. Pat. No. 4,600,562 "Method And Apparatus For Filtering Engine Exhaust Gas";
U.S. Pat. No. 5,657,923 "Brazing Of Catalyzed Converter Bodies";
U.S. Pat. No. 5,824,202 "Electrode For Use In Membrane Electrolyzers";
U.S. Pat. No. 4,098,722 "Methods Of Fabricating Bodies";
U.S. Pat. No. 4,205,420 "Process For Making A Bent Metal Tube Having A Metal-Ceramic Liner"; and
U.S. Pat. No. 4,838,067 "Corrosion Resistant Corrugated Metal Foil For Use In Wound And Folded Honeycomb Cores".

However, these references all disclose either a filter or oxidation catalyst-type device having the disadvantages as described above. The only prior art patent which shows the use of a wire mesh is U.S. Pat. No. 5,018,272, however the wire mesh is used only structurally to surround the catalyst to hold it securely within the outer casing. It provides no catalytic effect. There is therefore a need in the art for a highly efficient, cost-effective device for removing particulate and other harmful emissions from diesel engine exhaust.

SUMMARY OF THE INVENTION

To meet the needs in the art as explained above, the present invention utilizes a specific structure and unique catalytic material which, for the purposes of this disclosure, will be referred to as a "particulate reactor". The particulate reactor substrate is a unique metallic substrate in the form of a knitted metal fabric which, when coated with catalytic materials, will continuously oxidize 60%+ of the carbon particles that enter it. This new technology more closely fits into the previously described flow-through oxidizer category than the filter trap because exhaust flows through the reactor unrestricted. The reactor is not a filter, hence there is no process of carbon particle collection or necessity for filter regeneration.

The manufacturing steps include first roll-stamping small, raised dimples in the fabric substrate to control its density. The dimples standoff adjacent layers in the spooled roll, creating greater space between them. Next, the dimpled fabric undergoes high temperature firing for hardening and degreasing, and then water quenching to harden the metal which improves heat tolerance. The treated metal knit is then aluminum oxide shot-blasted to etch the fabric surface for improved ceramic coating adhesion and increase surface area. Next, the fabric is coated with a wet slurry of an undercoating ("wash coat") prior to spooling and pressing the fabric into individualized cartridges that are held tightly wound by an encircling sleeve. Next, the sleeved spools are oven-fired. Then, the fired spools are impregnated with the catalytic precious metal. The impregnated sheathed spools are then oven-fired again and finally "canned" into an outer enclosure.

The manufacturing techniques disclosed herein are important because the reactor matrix cannot be coated by conventional dipping or drenching techniques. Ceramic coating slurries will not flow through this substrate. Regardless of insertion pressure or viscosity of the slurry, the enormous surface area and surface tension tends to cause the coating materials to conglomerate and completely clog the substrate. The process disclosed herein uniformly and controllably coats the substrate raw materials prior to configuration of the substrate.

The operation of the catalytic reactor of the present invention may be briefly described as follows. As fast moving exhaust gas encounters the face of the reactor cartridge, the cartridge design disperses exhaust gas evenly throughout the volume of the matrix, thus eliminating center channeling and utilizing the entire matrix more efficiently. Exhaust gas then encounters a torturous flow path consisting of a knitted metal fabric matrix having approximately 27 million uniform loophole paths per cubic foot of spooled metal fabric volume. This unique medium makes it impossible for carbon particles to pass through the device without having relentlessly impacted the catalyzed threads making up each loophole path. Carbon particles incinerate as they impact the fabric threads which are glowing red from the catalytic exothermic reaction. The reactor design slows down the unburned carbon particles rate of passage, yet the loophole density is sufficiently open as to eventually let unburned particles pass. The center-to-center loophole density is sufficiently dense as to allow radiant heat from each thread to combine and cause temperatures in the airspace between them to maintain sufficient temperature to incinerate passing carbon particles. This structure causes gas turbulence and increased particulate residence time within this unique oxidizing environment and results in extraordinarily high particulate oxidation rates.

Because the exhaust is able to move in all directions inside the reactor, it tends to evenly disperse immediately upon entering the face. This effect eliminates honeycomb substrate "channeling" and makes the full volume of reactor substrate available regardless of exhaust velocity and volume. Furthermore, since the carbon burns in the process, additional heat is liberated. Micron-sized particles passing between the fabric's loops are incinerated in the high temperature field, and also as they impact the fabric. As a result, mid-cartridge temperatures are maintained 200–300 degrees Fahrenheit higher than mid catalyst temperatures noted with conventional oxidation catalysts under the same conditions, of the same volume and catalytic loading. Higher mid-reactor temperatures are desired because the reactor is incinerating carbon in addition to oxidizing gaseous pollutants. Conventional oxidation catalysts are only designed to oxidize gaseous unburned hydrocarbon and other gaseous organic materials by way of exothermic reaction on the treated honeycomb surface. Other objects and advantages of the present invention will be readily apparent to those with skill in the art from the following drawings and description of the preferred embodiment.

DESCRIPTION OF THE PREFERRED EMBODIMENT

Figure 1:
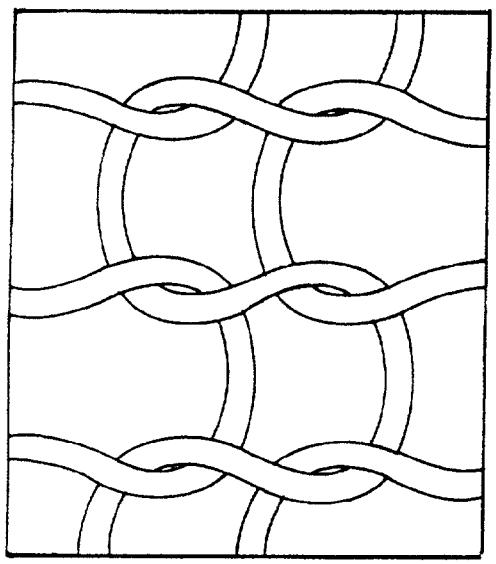
FIG. 1 is a top closeup view of the knitted metal fabric core substrate of the present invention.

Referring now to FIG. 1, a critical element of the present invention is the core substrate. As shown in this Figure, the substrate is made from a knitted metallic fabric which itself has an organized and repeatable pattern. The fabric has an open loop structure such that exhaust gas easily passes through it and may be a single or double-strand knit. The fabric is made of alloy wire threads which are knitted into a metal fabric that has a consistent pattern with uniform density and convenient widths such as 2", 4" and 6" that can be of any length convenient for mass production, for example, 100 to 200 feet. The long rolls of fabric are then processed in a continuous manner to produce small substrate spools. The catalyzed metal fabric can be of any width or any desired knit density. The spooled reactor cartridge has 27 million loophole paths per cubic foot of volume however different knit densities may be employed as desired. The finished substrate unit provides a highly efficient and continuous carbon particulate oxidizing environment without the problems of carbon accumulation and associated back pressure and overheating. Since there is no established technique to manufacture it, this new substrate design is unique. The following manufacturing process has been devised for this new substrate.

The Manufacturing Process

Figure 2:
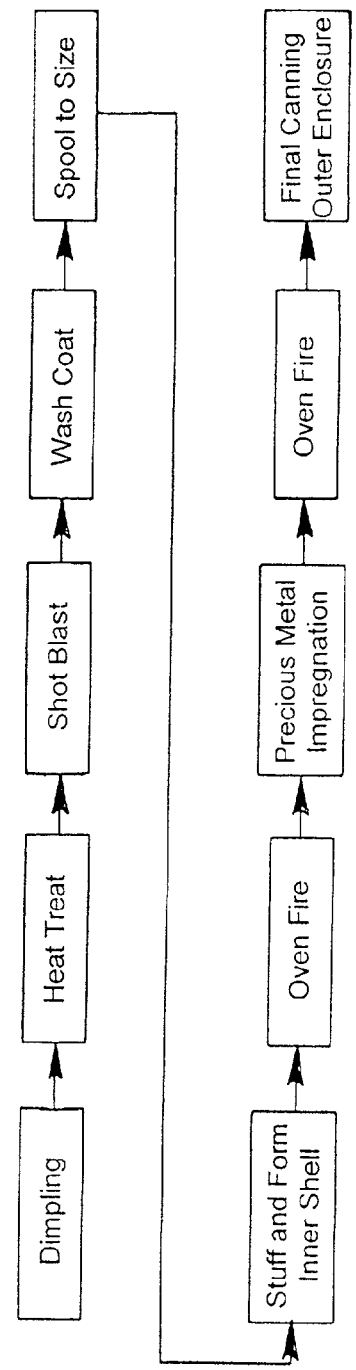
FIG. 2 is a chart which shows the various steps in the process of creating the catalytic reactor of the present invention.

A summary of the manufacturing process showing each of the process steps is depicted in the chart of FIG. 2. FIGS. 3–6 diagrammatically show the equipment developed to perform the various manufacturing steps required for the novel substrate to yield the catalytic converter of the present invention.

Figure 3:
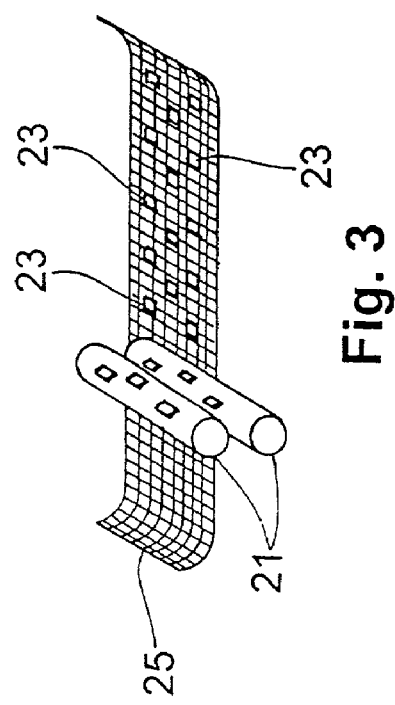
FIG. 3 is a top right perspective view of the core substrate being dimpled between impression rollers.

Referring now to FIG. 3, the spool of metal fabric 25 is first passed through stamping rollers 21 which press irregularly shaped, raised dimples along the surface of the fabric. The dimples can be any shape, however a square having a dimension of 0.25" long×0.25" wide×0.125" deep is preferred. The dimples serve as fabric layer stand-offs when the fabric is spooled. Since the dimples are embossed with irregular spacing along the length and width of the fabric, they will not fall upon each other as the wound layers overlap.

Figure 4:
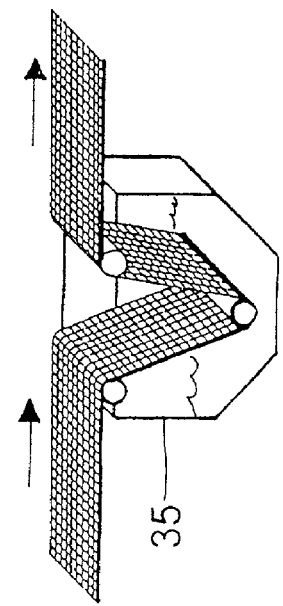
FIG. 4 is a diagram showing the core substrate being heat treated.
Figure 4:
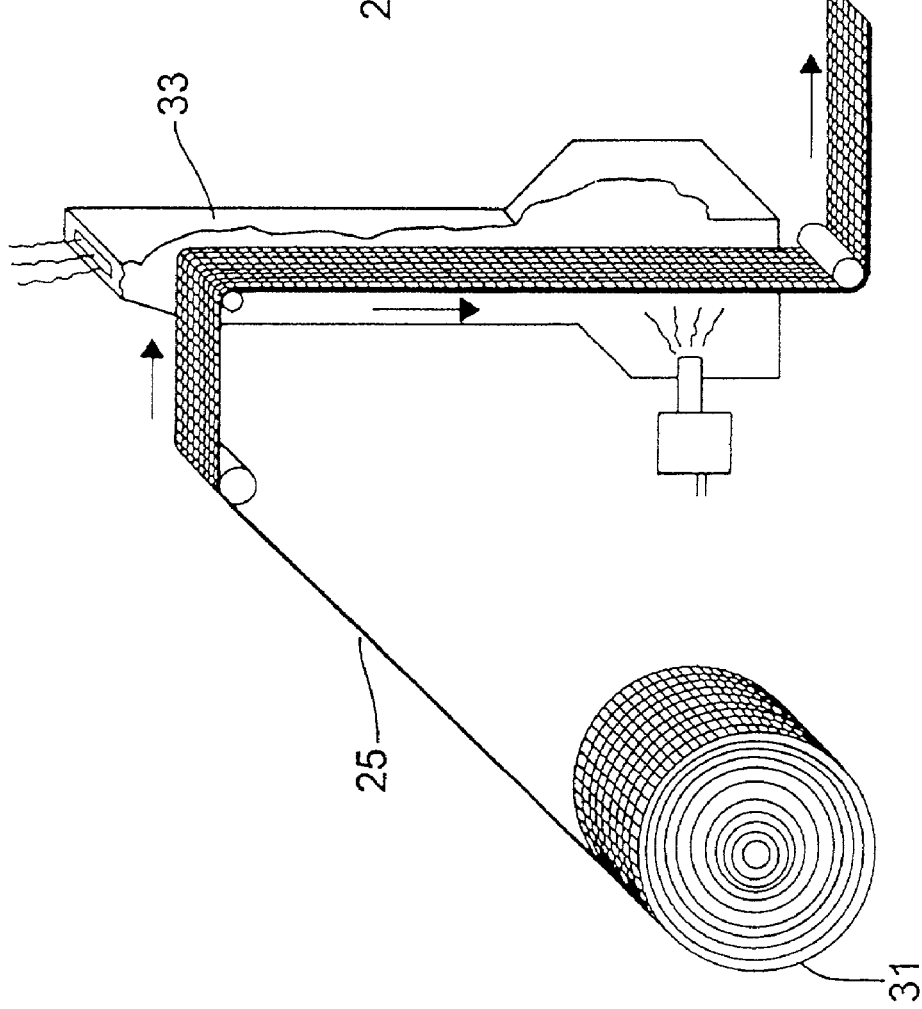

Referring now to FIG. 4, the dimpled fabric next undergoes a firing and quenching process which burns off oils and hardens the alloy. As shown in this illustration, the dimpled knitted substrate 25 is delivered to a process line in a roll 31 and then travels through a high temperature chamber 33 which raises the temperature of the alloy fabric and burns away all oil. Immediately upon exiting the heat chamber, the fabric is fast quenched in a water bath 35. This process also hardens the fabric.

Figure 5:
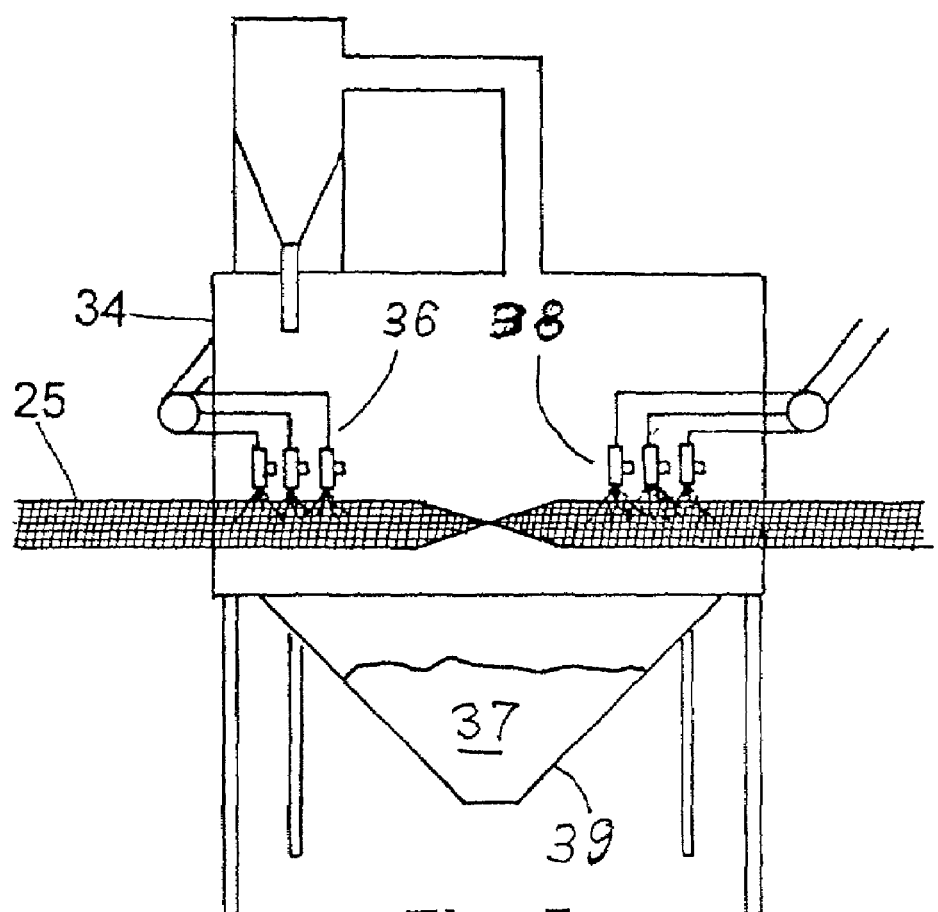
FIG. 5 is a diagram showing the core substrate being shot-blasted.

Referring to FIG. 5, the cleaned and hardened fabric 25 next passes through a blast chamber in which the fabric is aluminum-oxide shot-blast etched. This may be accomplished by blast guns 36 and 38 which blast materials such as aluminum oxide that impacts the mesh as it passes by. The shot-blast etching greatly increases the surface area of the fabric and improves the adhesion of the coating applied in the next step. In order for both sides of the mesh to receive the shot-blast etch uniformly, a unique system has been devised whereby the fabric mesh is twisted 180° at a point along the fabric line between two banks of downward firing blast guns. The first bank of guns 36 treats one side of the fabric and a second bank of guns 38, located downstream of the twist point, treats the opposite side of the fabric. This provides uniform treatment of the material on both sides and provides efficient use of the abrasive blast material because direction of all the blast guns are both downward and the abrasive material 37 quickly collects in a hopper 39 below.

Figure 6:
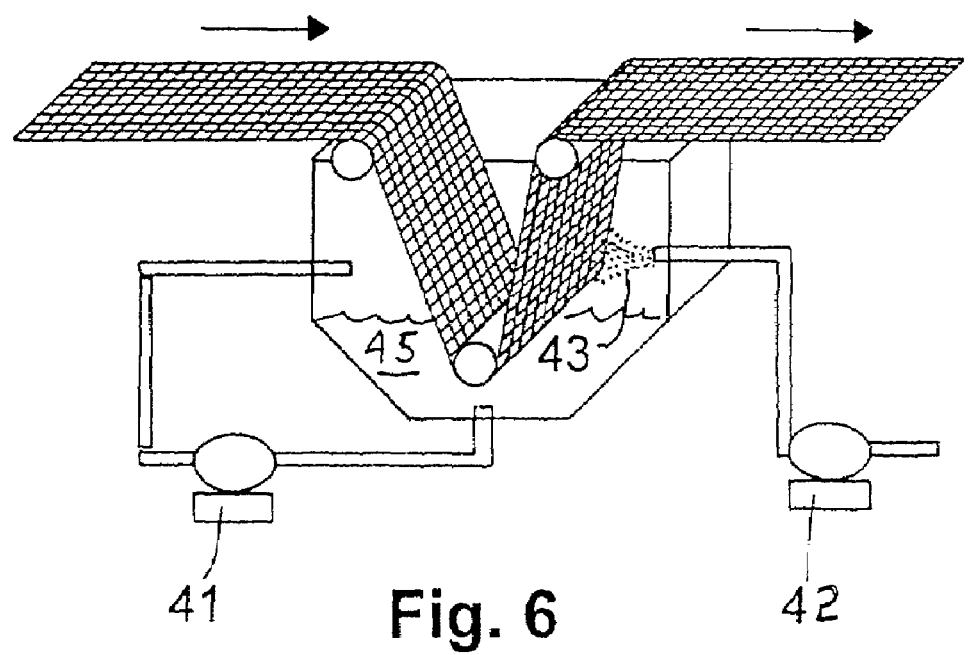
FIG. 6 is a diagram showing the fabric being coated and air blasted to remove excess catalytic material.

Referring now to FIG. 6, the fabric is next undercoated with a ceramic support material by being passed through a slurry bath 45 which is agitated by a circulating pump 41 to keep the components of the slurry evenly mixed and controlling the viscosity so that the coating left on the substrate is uniform as it exits the bath. This step is immediately followed by a pressurized curtain of air 43 provided by pump 42 which blows off the excess ceramic slurry from the fabric. The force of the air curtain is selected to ensure that only the fabric threads are coated while the open areas between the threads remain clear of any coating material that would clog them. While the above-disclosed method is preferred, it should be understood that fabric coating may be achieved by other processes. The ceramic slurry may contain gama alumina, zirconia or zeolite.

Figure 7:
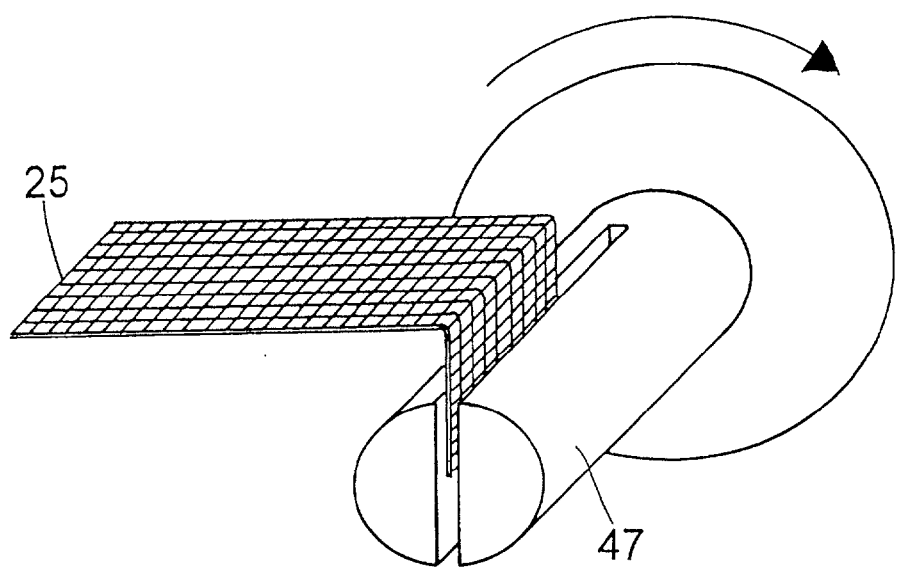
FIG. 7 is a diagrammatic view showing the manufacturing process for spooling the core substrate.
Figure 8:
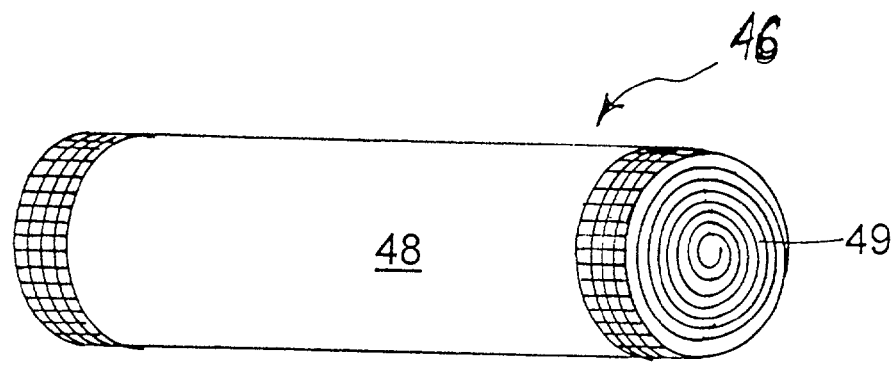
FIG. 8 is a top right front perspective view of the spool-wound substrate held by an inner sleeve.

As shown in FIGS. 7 and 8, the ceramic coated substrate 25 is then spooled and cut to length to provide the desired diameter and density as follows. An operator controls the progress and speed of the entire production line via a foot pedal controlling a variable speed motorized spooling arbor 47. Utilizing a meter which counts the number of feet that travels through it, the operator can spool an exact amount of material time and time again for a given spool diameter. Metering the lineal feet of fabric on each reel ensures consistency in the total catalyst volume and total surface area of a given finished substrate size (i.e. 25.0° of fabric is used to construct a 6.0" round substrate, and so on). After the spool reaches the correct length, the foot pedal is released and the line stops. The mesh is then cut and the coil 49 removed from the arbor and pressed into a light gauge cylindrical inner sleeve 48 (as shown in FIG. 8) which holds sections of the coated mesh separately in tightly wound cartridges 46. The spools of treated substrate material are cut to a specific length and spooled to a tension which makes the substrate fit tightly into the casings. The cartridges 46 may then be separately handled for further processing. At this point in the manufacturing process the cartridges can be formed into any convenient shape to match their final canned configuration. Regardless of the final shape, the retaining enclosure maintains the shape during catalyst impregnation and high temperature firing steps.

In the next step of the process, the individual cartridges are oven-fired to a temperature of 500° C. for a duration of approximately 60 minutes. Thereafter, the individual coils are drenched by simple dipping into a bath of catalytic solution. The catalytic bath is comprised of an aqueous solution of precious metals. After the catalytic material is applied, the coil is once again oven-fired to a temperature of 500° C. for 60 minutes. As an alternative, the precious metal impregnation may occur during the ceramic materials coating step if the precious metal solution is added to the wash coat. The precious metal may be platinum, palladium or rhodium.

Figure 9:
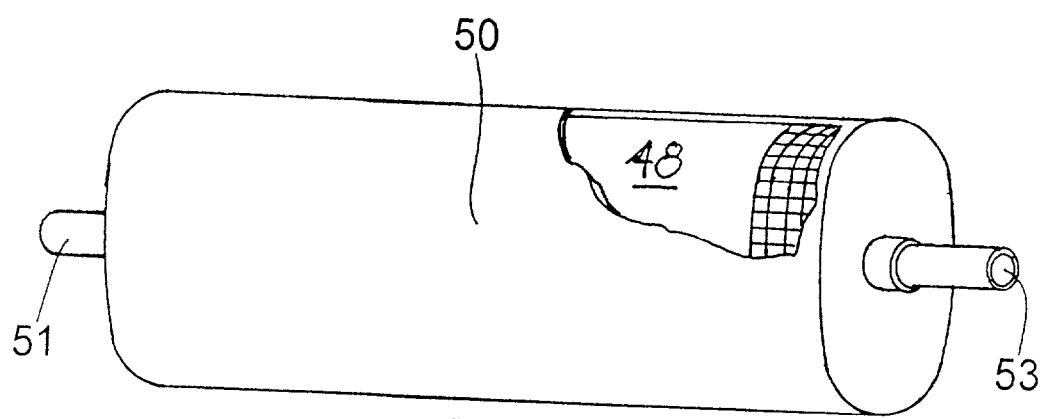
FIG. 9 is a top right front perspective view of the completed invention.

Finally, as shown in FIG. 9, the finished cartridge is pressed into a second tubular or otherwise shaped metal outer casing 50. The outer sleeve is of heavy gauge metal as it provides the final outer metal casing of the unit. The casings have end caps or other structures which include an inlet port conduit 51 and an outlet port conduit 53 for interconnection of the usual engine exhaust pipes. The present invention disclosed herein is unique because of its symmetric three-dimensional open-ended flow path which allows the exhaust gas entering the unit to disperse in any direction. This three-dimensional flow path is a clear departure from existing straight through channeled substrates of traps. Turbulence and gas flow direction changes in an oxidizing environment are both known to dramatically increase catalytic action. The exhaust gas is turbulent throughout the entire passage through the reactor which causes greater exothermic heat release. This results in meaningful higher average temperatures inside of the reactor 300–400° F. higher than other substrate structures. Since catalytic oxidation relies on heat to complete the reaction, and since diesel exhaust gas temperature is often insufficient to initiate and sustain a catalytic reaction, the added heat generated by the reactor design is an important and meaningful advantage. The reactor's higher average core temperature more often remains above the minimum catalyst operation threshold.

Furthermore, of great significance is that the present invention requires only one-half the precious metal required of less efficient oxidation catalysts of the same volume. As precious metals account for about 50% of the manufacturing cost of diesel catalysts, the reactor represents a significant and meaningful reduction in cost. Because the present invention performs in equilibrium, the substrate has no inclination to permanently trap carbon particulate and therefore does not go through loading and regeneration cycles characteristic of trap devices, nor does it overheat or cause excessive back pressure. Unlike metal fibril filter devices, the present invention can be cost effectively coated with a consistent layer of catalyst coating providing controlled, predictable results.

It will therefore be readily understood from the foregoing description that the object of the present invention to provide a highly efficient, cost effective device for removing particulate emissions from diesel engine exhaust has been met. It should be understood, however, there may be many modifications, adaptations and changes that may be made without departing from the invention disclosed herein, which should be determined only by the following claims and their legal equivalents.

What is claimed is:

1. A method of manufacturing a catalytic converter for an internal combustion engine exhaust comprising the steps of:
   providing a length of metal fabric;
   roll stamping indentations into the surface of said metal fabric;
   heating and quenching the surface of said fabric;
   etching said fabric by shot-blast etching;
   coating said fabric with a liquid ceramic material;
   spooling said coated fabric into individual cartridges;
   oven-firing said cartridges;
   impregnating said ceramic material with a catalytic precious metal; and
   oven-firing said cartridges a second time.

2. The method of manufacturing the catalytic converter of claim 1 further including the final step of pressing fabric into an outer metal casing.

3. The method of manufacturing the catalytic converter of claim 1 further described in that said ceramic material is from the group of gama alumina, zirconia or zeolite.

4. The method of manufacturing the catalytic converter of claim 1 wherein said precious metal is from the group of platinum, palladium or rhodium.

5. The method of manufacturing the catalytic converter of claim 1 wherein said step of coating said fabric with a ceramic material comprises first passing said fabric through a bath of liquid ceramic material to coat said fabric, and then blowing off an excess of said ceramic material from said fabric with pressurized air.

6. The method of manufacturing the catalytic converter of claim 1 wherein said step of etching said fabric further described as moving said fabric beneath two blast guns and applying a 180° twist to said fabric at a point between said blast guns, one blast gun being upstream of said twist and a second blast gun being downstream of said twist, whereby said blast guns etch both sides of said fabric with an abrasive blast.

* * * * *